(No Model.)
G. H. ALTON.
BUTTON SETTING INSTRUMENT.
No. 283,453. Patented Aug. 21, 1883.
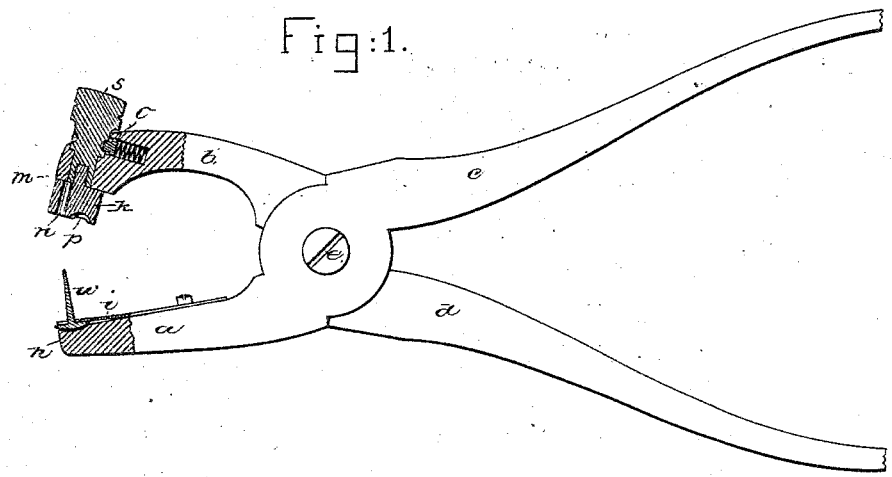
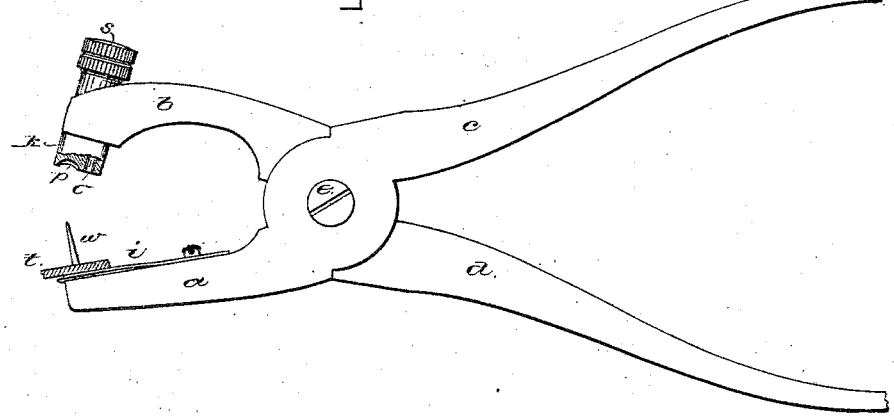
Witnesses.
Fred A. Powell
John F. C. Brinkert
Inventor.
George H. Alton
by Crosby Gregory
attys

UNITED STATES PATENT OFFICE.

GEORGE H. ALTON, OF LYNN, MASSACHUSETTS, ASSIGNOR TO THE BELLE PATENT BUTTON FASTENING COMPANY, OF SAME PLACE.

BUTTON-SETTING INSTRUMENT.

SPECIFICATION forming part of Letters Patent No. 283,453, dated August 21, 188?.

Application filed June 30, 1883. (No model.)

*To all whom it may concern:*

Be it known that I, GEORGE H. ALTON, of Lynn, county of Essex, State of Massachusetts, have invented an Improvement in Button-Setting Instruments, of which the following description, in connection with the accompanying drawings, is a specification, like letters on the drawings representing like parts.

My invention relates to an implement for setting or fastening buttons upon leather or other material by a metallic fastening, shown as a headed tack having a malleable point or shank to pierce the material and be clinched about the eye of the button. The implement employed in this instance consists, essentially, of two members, shown as jaws pivoted together and having handles to operate like pliers, one of the said members being provided with a tack-holding device to engage the head of the fastening or tack and hold it in proper position to pierce the material when the members or jaws are forced together by the handles. The other jaw or member has an anvil-piece provided at its upper face, at opposite sides of the post about which the anvil is made to turn, with a clinching-surface, and with an opening to receive the point or shank of the tack, the said anvil, when in one position, operating as a support for the material, as when the tack or single-pronged fastening is forced through it the tack then entering the said opening, while in its other or second position the anvil-face presents a clinching-surface opposite the point of the tack, so that when the jaws are again pressed together, a button having been hung upon the tack previously inserted through the leather, the point of the tack, by meeting the said clinching-surface, will be bent or clinched around the shank of the button, fastening it securely. A locking or holding device is employed to retain the anvil-piece in proper position to co-operate with the tack held by the other jaw, and the anvil-piece is provided with a thumb-nut, by which to turn it.

Figure 1 is a side elevation and a partial section of a button-setting implement embodying this invention, the jaws being open; Fig. 2, a similar view, partly in longitudinal section, a tack having been forced through the material;
and Fig. 3 is a face view of the anvil-piece.

The implement consists, mainly, of two members or jaws, $a$ $b$, provided with handles $c$ $d$, and pivoted together by a pivot, $e$, the said members being acted upon by a suitable spring tending to separate the jaws.

The jaw $a$ is provided with a tack-holding vice, consisting of a seat, $h$, to receive the head of the tack $w$, and a forked spring, $i$, adapted to engage the under side of the said head, embrace the shank or point of the tack, and hold it securely in the said seat, as shown in Figs. 1 and 2.

The co-operating jaw $b$ is provided with a movable anvil-piece, $k$, the under side of which is seated upon the said jaw, and which is held thereon by the post $m$, which receives the thumb-nut $s$, the latter, in engagement with the post, serving as the pivot or center of motion for the anvil-piece.

The upper side of the anvil-piece is provided, at one side of the center of the post $m$, with an opening, $n$, and at the other side of the center of the said post with a clinching-surface, $p$, and the said anvil-piece is turned, when desired, by the operator engaging the thumb-piece $s$. When the anvil-piece is turned to place the opening $n$ opposite the point of the tack held upon the jaw $a$, as in Fig. 1, the said opening will receive the shank of the said tack when the jaws are pressed together to force the point of the tack through the leather or other material $t$, resting against the face of the anvil-piece $k$ and supported thereby. When the clinching-surface $p$ of the anvil-piece is rotated to place the said surface opposite the point of the tack held by the jaw $a$, the said point will be curled over or be clinched when the jaws are forced together. The holding or locking device $o$ (shown in Fig. 1) has a spring-pressed stud which engages the thumb-nut $s$, holding it in proper position with relation to the jaw $b$ and the tack held by the jaw $a$. The said holding device yields when the anvil-piece $k$ is forcibly turned on its pivot by the operator.

When the apparatus is in use, the post $m$ will be substantially in vertical position, and the anvil-piece $k$, supported at its under side, so as not to tip or rock, will rotate in a plane parallel with relation to the face of the jaw $b$.

In operation a tack is placed in the tack-holding device h i, and the material to which the button is to be fastened is placed on the face of the anvil-piece k, which is then held by the device o, with the opening or passage n in position to receive the point of the tack, after which the jaws are pressed together, forcing the tack through the material and into the passage n without bending its shank. The jaws are then permitted to separate, the material remaining upon the shank of the tack, and close to its head, and the eye of the button-shank is then placed over the shank of the said tack, as shown in Fig. 2. The anvil-piece k is then turned by the operator, who engages the thumb-nut s, thus presenting the clinching-surface p opposite the point of the tack, when the jaws are again pressed together, and the point of the tack, striking upon the said surface p, is clinched or curled over around the shank of the button, securely fastening it upon the material. A device of this kind operates equally well with buttons of all sizes, and is certain in its operation.

I claim—

1. A button-setting implement composed of two members, one of the said members being provided with a tack-holding device, and the other with a pivoted anvil-piece, having at its face an opening or passage to receive the point of the tack without bending it, and a clinching-surface to operate upon the point of the tack and clinch it about a button-shank, the said opening or passage and the said clinching-surface being at opposite sides of the center of rotation or pivot of the said anvil-piece, and the latter being arranged to rotate in the plane of the face of the jaw supporting it, all substantially as described.

2. In a button-setting implement, the combination of one member or jaw provided with a tack-holding device, of the co-operating member provided with a pivoted anvil-piece having a tack-receiving opening, n, and a clinching-surface, p, at its face, and a holding device, o, whereby the said anvil-piece is retained in proper position with relation to the tack held by the other member of the implement, substantially as described.

3. In a button-setting implement, the combination of one member or jaw provided with a tack-holding device, of the co-operating member provided with a pivoted anvil-piece having a tack-receiving opening, n, and a clinching-surface, p, at its face, and having a post provided with a thumb-nut by which the said anvil-piece may be turned, and a locking device to hold the said anvil-piece in operative position, all substantially as shown and described.

In testimony whereof I have signed my name to this specification in the presence of two subscribing witnesses.

GEO. H. ALTON.

Witnesses:
   JOS. P. LIVERMORE,
   BERNICE J. NOYES.